United States Patent
Hamm

(10) Patent No.: US 10,486,582 B1
(45) Date of Patent: Nov. 26, 2019

(54) RATCHET STRAP KEEPER

(71) Applicant: Micah Hamm, Warren, MN (US)

(72) Inventor: Micah Hamm, Warren, MN (US)

( * ) Notice: Subject to any disclaimer, the term of this patent is extended or adjusted under 35 U.S.C. 154(b) by 0 days.

(21) Appl. No.: 15/356,547

(22) Filed: Nov. 19, 2016

Related U.S. Application Data

(60) Provisional application No. 62/258,210, filed on Nov. 20, 2015.

(51) Int. Cl.
  *B60P 7/08* (2006.01)
  *B65D 63/10* (2006.01)
  *B65D 63/16* (2006.01)

(52) U.S. Cl.
  CPC .......... *B60P 7/0846* (2013.01); *B65D 63/109* (2013.01); *B65D 63/16* (2013.01); *B65D 2563/107* (2013.01)

(58) Field of Classification Search
  CPC ...... B60P 7/0846; B65D 63/109; B65D 63/16
  See application file for complete search history.

(56) References Cited

U.S. PATENT DOCUMENTS

| | | | | |
|---|---|---|---|---|
| 867,814 A | * | 10/1907 | Fornander | A42B 7/00 132/57.1 |
| 1,540,155 A | * | 6/1925 | Wydom | H01M 2/1005 16/423 |
| 1,571,494 A | * | 2/1926 | Scott | A41F 15/002 2/323 |
| 1,672,214 A | | 5/1927 | Hayden | |
| 1,756,506 A | * | 4/1930 | Stafford | A43C 11/14 24/300 |
| 2,792,607 A | * | 5/1957 | Packham | A44C 1/00 24/350 |
| 3,751,772 A | * | 8/1973 | Grandjanny | F16G 11/02 24/115 A |
| 3,936,914 A | * | 2/1976 | Mancini | A44B 11/2588 24/684 |
| 4,040,550 A | * | 8/1977 | Kleinert | B65D 25/2873 294/170 |
| 4,432,121 A | | 2/1984 | Dupre | |
| 4,559,677 A | | 12/1985 | Tracy | |
| 4,700,432 A | | 10/1987 | Fennel | |

(Continued)

FOREIGN PATENT DOCUMENTS

WO 2005024267 A2 3/2005

*Primary Examiner* — Robert Sandy
*Assistant Examiner* — David M Upchurch
(74) *Attorney, Agent, or Firm* — DuFault Law Firm, P.C.; Dustin R. DuFault

(57) ABSTRACT

A device for retaining unused portions of a tie-down strap comprises first and second hooks attached to opposing ends of an elastic cord. Each hook, oriented 180 degrees relative to one another, is for receiving selected portions of the tie-down strap. The hooks each include a first substantially flat member attached to the respective end of the cord, a second member disposed opposite the first member, and a crook connecting the first member and the second member. The second member is spaced-apart from, and resiliently flexible relative to, the first member. Disposing either hook onto the selected portion of the tie-down strap frictionally engages the hook. The device is disposable about the unused portions of the tie-down strap, wherein each hook disposes onto a portion of the strap, and the cord prevents the straps from coming undone.

8 Claims, 2 Drawing Sheets

(56) References Cited

U.S. PATENT DOCUMENTS

| | | | | |
|---|---|---|---|---|
| 4,793,030 | A * | 12/1988 | Hirsch | A44C 5/16 24/265 WS |
| 4,815,172 | A | 3/1989 | Ward | |
| 4,885,824 | A * | 12/1989 | Schwab | B65D 63/14 24/115 H |
| 5,035,558 | A | 7/1991 | Prosen | |
| 5,383,259 | A | 1/1995 | McIntire | |
| 5,449,128 | A | 9/1995 | Crisci, Jr. | |
| 5,676,178 | A * | 10/1997 | Ehnimb | D03D 3/06 139/384 R |
| 5,682,652 | A | 11/1997 | Brody et al. | |
| 5,797,167 | A | 8/1998 | Schwab | |
| 5,809,620 | A * | 9/1998 | Crowley | B60P 7/0838 24/265 CD |
| 5,836,060 | A | 11/1998 | Profit | |
| 5,848,864 | A * | 12/1998 | Selby | B60P 7/0876 410/97 |
| 5,902,082 | A | 5/1999 | Kaemper | |
| 6,014,794 | A * | 1/2000 | McCoy | B62J 7/08 24/265 H |
| 6,094,784 | A | 8/2000 | Schrader | |
| 6,345,416 | B1 * | 2/2002 | Vollmar | E05B 85/10 16/24 |
| 6,523,227 | B2 * | 2/2003 | Goodall | A45F 5/00 2/45 |
| 6,618,912 | B1 * | 9/2003 | Chang | B60P 7/0807 24/265 CD |
| 6,789,671 | B2 | 9/2004 | Morrison et al. | |
| 6,877,190 | B2 | 4/2005 | Berger | |
| 7,165,294 | B2 | 1/2007 | Surdam | |
| 7,171,731 | B1 | 2/2007 | Borcherding | |
| 7,473,063 | B1 * | 1/2009 | Adams | B60P 7/0823 410/116 |
| 7,681,286 | B1 | 3/2010 | Lewis et al. | |
| 7,805,816 | B1 * | 10/2010 | Thorne, III | B60P 7/0807 24/265 H |
| 8,099,838 | B2 * | 1/2012 | Wang | F16G 11/103 24/265 H |
| 9,199,571 | B2 * | 12/2015 | Leung | B60P 7/0823 |
| 9,457,706 | B2 * | 10/2016 | Wright | B60P 3/079 |
| 2003/0106187 | A1 * | 6/2003 | Jackson | B60P 7/0823 24/298 |
| 2004/0060155 | A1 | 4/2004 | Selby | |
| 2008/0282513 | A1 | 11/2008 | Richardson | |
| 2009/0241307 | A1 | 10/2009 | Ayers et al. | |
| 2011/0258817 | A1 | 10/2011 | Usher | |
| 2012/0266420 | A1 | 10/2012 | Pingelton | |
| 2014/0173855 | A1 * | 6/2014 | Milani | B65D 63/10 24/17 A |
| 2015/0013116 | A1 * | 1/2015 | Lindberg | B60P 7/0869 24/265 H |
| 2015/0305310 | A1 * | 10/2015 | Roberdeaux | F16B 2/08 24/130 |
| 2015/0342803 | A1 * | 12/2015 | Julian | A61F 15/006 602/78 |

* cited by examiner

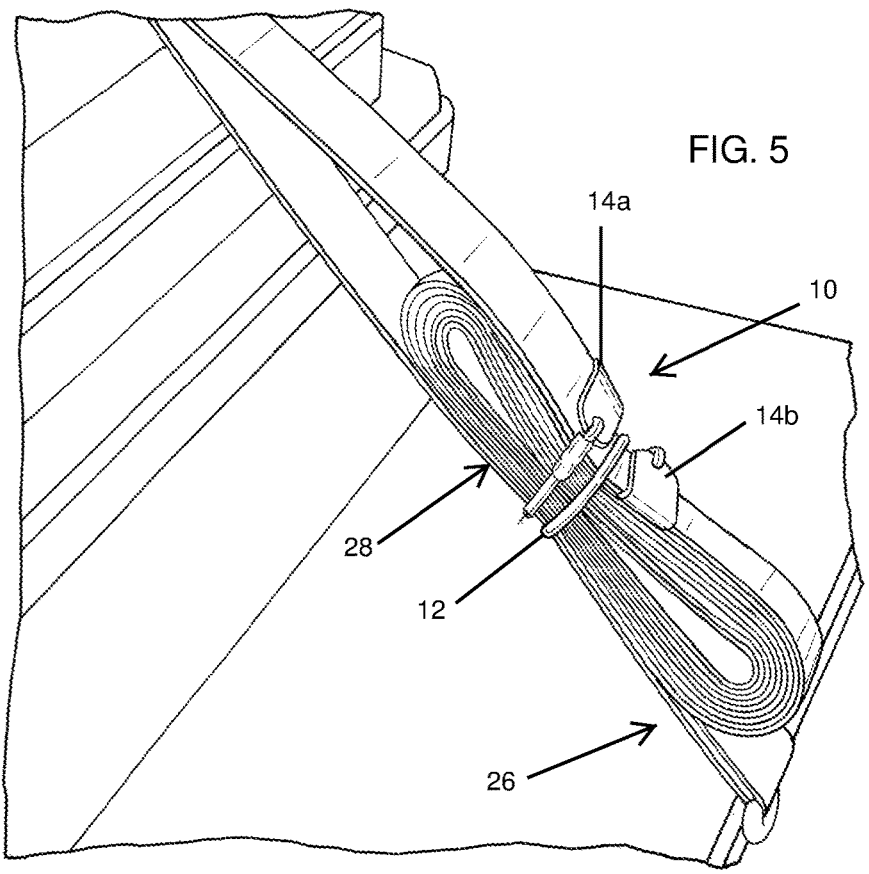
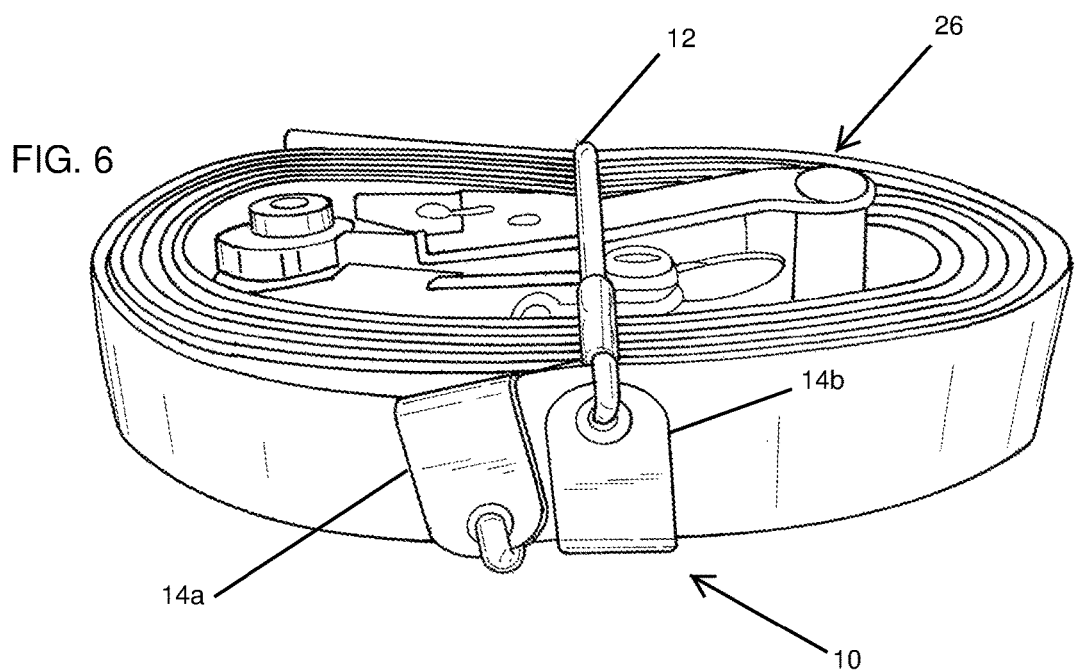

RATCHET STRAP KEEPER

CROSS-REFERENCE TO RELATED APPLICATION(S)

The present application claims a benefit of similarly titled U.S. Provisional Application No. 62/258,210 filed on Nov. 20, 2015, which is hereby incorporated herein in its entirety by reference.

BACKGROUND OF THE INVENTION

The present invention relates to ratchet straps, or tie-downs, used for securing cargo during transportation. More particularly, the present invention relates to a keeper that assists in retaining unused portions of the strapping during use, as well as to bundle the entire ratchet strap when not in use.

Ratchet straps, or tie-downs, are well known in the art as a means by which to secure cargo or objects during transportation. Ratchet straps can be used with numerous types of transportation vehicles, including pickup-truck beds, semi trailers, flat-bed trucks, flat-bed trailers and rail cars. A ratchet strap generally consists of two separable parts. The first part includes a flexible strap of webbing material having a hook connected to a first terminal ends and a ratchet device connected to an opposing second end. The second part includes a longer flexible strap of webbing material with another hook connected to a terminal end. Each hook is for attaching to an area of the transportation vehicle. The free terminal end of the strap of the second part is inserted into the ratchet of the first part, wherein excess strapping of the second part is pulled through until the strap secures the object to be retained. The ratchet can then be used to further pull the strap of the second part to more fully secure the object to the transportation vehicle. When the object is secure, there is generally excess strap from the second part that must be retained in some fashion otherwise it may flap in the wind during transportation, wherein it may become damaged or entangled with other objects. It is therefore an object of the present invention to provide a device which quickly and easily secures this excess strapping material.

When not in use, the strappings of each part are generally rolled up into a bundle and set aside. However, as there is no natural means of securing the rolled up ratchet strap, the strappings often times tend to come undone, resulting in being untidy and coming entangled with themselves, other ratchet straps or other items. It is therefore another object of the present invention to provide a device which keeps ratchet straps kept together when not in use.

BRIEF SUMMARY OF INVENTION

The present invention includes a device for retaining unused portions of a tie-down or ratchet strap, either when the ratchet strap is in use, or is in storage. The device comprises first and second hooks connected by an elastic cord. Each hook is preferably oriented 180 degrees relative to one another, and is disposable onto selected portions of the tie-down strap once the cord has been disposed thereabout. To enable proper engagement with the portions of the tie-down strap, each hook includes a first substantially flat member attached to the cord, a second member disposed a selected distance from the first member, and a crook connecting the second member to the first member. The second member is spaced-apart from, and resiliently flexible relative to, the first member. The spacing of the second member relative to the first member allows the hook to be disposable onto the selected portion of the tie-down strap such that the strap is enagaged against both inside surfaces of the first and second members, with the resiliency of the second member permitting frictional engagement of the hook thereto. Both the first member and the second member of each hook have a width suitable to prevent unwanted torqueing, or pivotal movement, of the hook relative to the strap.

In operation, the first hook is positioned over and clasped to the selected portion of the tie-down strap, with the cord then being disposed about and wrapped around the entire ratchet strap apparatus in a snug manner, wherein the second member is positioned over and clasped to another selected portion of the tie-down strap. In this configuration, the cord prevents the straps of the ratchet strap from coming undone.

BRIEF DESCRIPTION OF THE DRAWINGS

The following figures are used herein in conjunction with the specification to assist in understanding the invention. The Figures are as follows:

FIG. 5 is a perspective view of the ratchet strap device of the present invention attached to a ratchet strap being used to secure an article.

FIG. 6 is perspective view of the ratchet strap device of the present invention attached to a ratchet strap while in a storage position.

DESCRIPTION OF THE INVENTION

Figure 1:
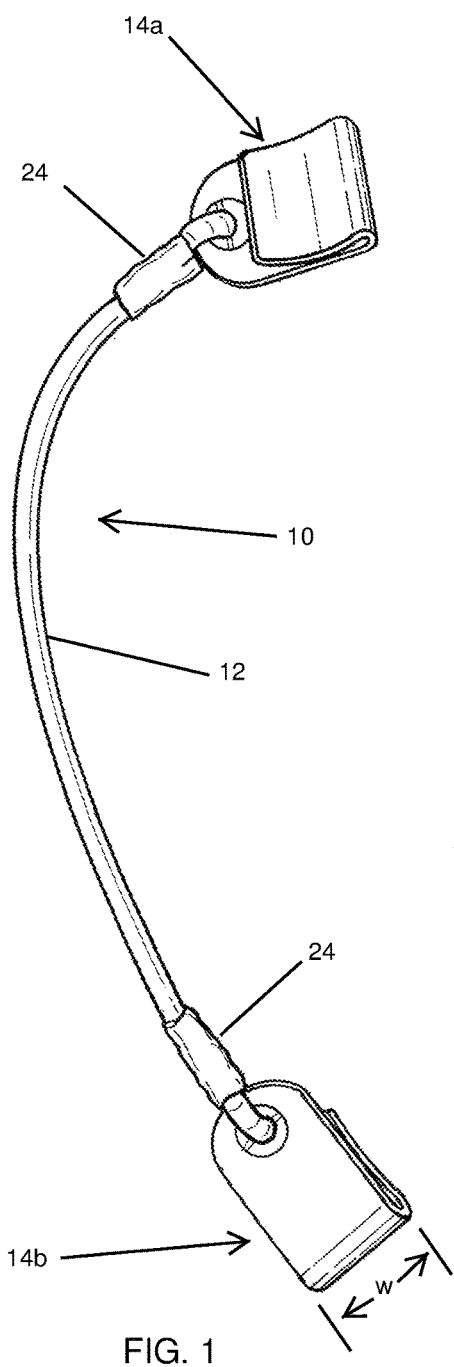
FIG. 1 is a perspective view of the ratchet strap device in accordance with the present invention.
Figure 2:
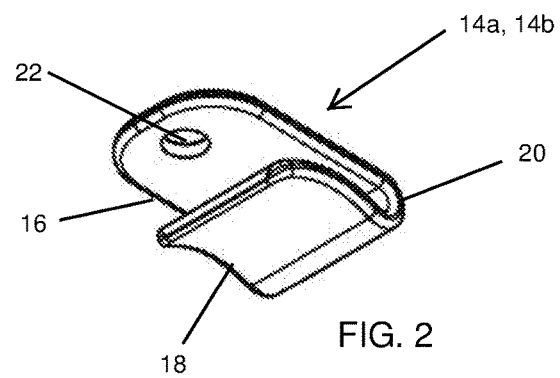
FIG. 2 is a top perspective view of a hook in accordance with the present invention.
Figure 3:
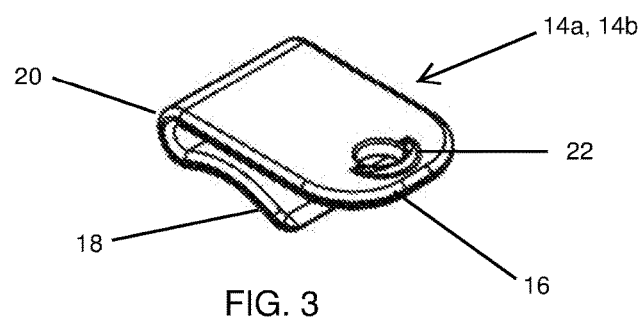
FIG. 3 is a bottom perspective view of the hook in accordance with the present invention.
Figure 4:
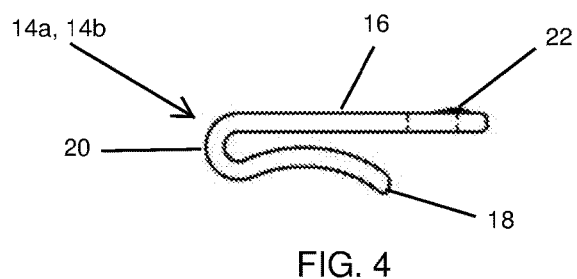
FIG. 4 is a side view of the hook in accordance with the present invention.

Referring to FIG. 1, a ratchet strap keeper in accordance with the present invention is generally indicated at 10. The ratchet strap keeper comprises a length of elastic cord 12, commonly referred to as bungee cord. However, those in the art will recognize that other elastic cords may be used, and still stay within the spirit of the present invention. Attached at each end of the elastic cord 12 is a generally flat hook 14*a* and 14*b*, respectively. As best illustrated in FIGS. 2, 3 and 4, each hook 14*a*, 14*b* includes a substantially flat portion 16 connected to an opposing second retaining portion 18 of similar width by a crook 20. By substantially flat it is meant that while the member would be preferably flat, small curves or curvature could be found in the member, with angles being less than 5 degrees, and still be considered flat. The first portion 16, crook 20 and second portion 18 are preferably unitarily constructed from a single piece of material, which may be either metal or plastic. The second portion 18, which is resiliently flexible with respect to the first portion 16, is spaced-apart from the first portion 16 a selected distance such that a portion of the flexible strap is disposable therebetween in a cross-wise fashion. When the hook 14*a*, 14*b* is disposed onto the portion of the strap in this manner, the resiliency provided by the crook 20 between the first member 16 and the second member 18 provides a snug frictional engagement of the hook 14*a*, 14*b* onto the portion of the tie-down strap.

Further, and as illustrated in FIG. 1, a width w of each hook, 14*a* and 14*b*, including the width of the first portion 16 and second portion 18, is wider than that of the elastic cord 12. This provides a larger surface area such that when the hook 14a, 14b is positioned onto the strap, torqueing or bending of the hook 14a, 14b on the strap is reduced, resulting in a more cooperable fit. Preferably, the width w of the hook 14a, 14b is at least twice the diameter of the cord 12, with the width w being more preferably at least three times the diameter of the cord 12, and with the width w being most preferably at least four times the width of the cord 12.

To connect each hook 14a, 14b to the cord 12, the top portion 16 of each hook 14a, 14b contains an aperture 22 through which the cord 12 can be inserted. The cord 12 is then turned on itself whereupon a binder 24 is applied as a form of attachment, thereby preventing the hook 14a, 14b from being removed. It should be noted, though, that other means of connecting each hook to the cord are known in the art. The connection of the hooks 14a, 14b onto the cord 12 is such that open end of the hooks are orientated 180 degrees, or opposite, from one another. In other words, the open end of each hook 14a, 14b is positioned opposite one another, as is illustrated in FIG. 1.

In operation, a ratchet strap 26 is employed to secure an item in the manner previously described. As illustrated in FIG. 5, the unused portion of strapping is folded into itself to form a bundle 28. The ratchet strap keeper 10 of the present invention is then positioned such that the first hook 14a is disposed cross-wise onto a first side of a selected outer exposed portion of the strapping 30. The cord 12 is then disposed, preferably at least once about the bundle 28 so that the cord is stretched and is under tension, whereupon the other hook 14b is disposed onto a second side of a selected outer exposed strapping proximate the first hook 14a. The positioning of the hooks 14a, 14b in this manner ensures a snug fit, and prevents the strapping from flipping or turning up whereby the hooks 14a, 14b could inadvertently released. Those skilled in the art will understand that the cord can be wrapped around more than once in order to achieve the desired tension.

When it comes time to remove the ratchet strap 26, the ratchet strap keeper 10 of the present invention can be easily removed by unhooking each hook. As illustrated in FIG. 6, when the ratchet strap is not in use, the strapping can be folded into itself to form a bundle, and the ratchet strap keeper 10 of the present invention can be disposed about the bundle and hooked to the outer strap in much the same way as previously described such that the bundle will be kept and not unravel when stowed or stored until the next use thereof.

Although the present invention has been described with reference to preferred embodiments, workers skilled in the art will recognize that changes may be made in form and detail without departing from the spirit and scope of the invention.

The invention claimed is:

1. A device for retaining unused portions of a tie-down strap, the device comprising:
   an elastic cord having first and second opposing ends;
   a first hook attached to the first end of the cord, and
   a second hook attached to the opposing second end of the cord 180 degrees relative to the first hook, each hook for receiving selected portions of the tie-down strap, the first hook and the second hook each comprising:
      a first member comprising a first end and an opposing second end, the first end attached to the respective end of the cord, the first member being substantially flat; and
      a second member disposed opposite the first member; and
      a crook connecting the second end of the first member with the second member, the second member resiliently flexible relative to the first member, the second member spaced-apart from the first member a selected distance to permit frictionally disposing the selected portion of the tie-down strap therebetween, the first member, the second member and the crook having a unitary construction of the same width, the width being greater than the a width of the elastic cord, wherein disposing the respective hook onto the selected portion of the tie-down strap the respective hook is retained in position by frictional engagement with the second member biasing the selected portion of the tie-down strap against the first member.

2. A device for retaining unused portions of a tie-down strap, the device consisting essentially of:
   an elastic cord having first and second opposing ends;
   a first hook attached to the first end of the cord, and
   a second hook attached to the opposing second end of the cord, each hook oriented 180 degrees relative to one another, each hook for receiving selected portions of the tie-down strap, the first hook and the second hook each consisting essentially of:
      a first member having a first end and an opposing second end, the first end attached to the respective end of the cord, the first member being substantially flat;
      a second member disposed opposite the first member; and
      a crook connecting the second end of the first member with the second member, the second member resiliently flexible relative to the first member, the second member spaced-apart from the first member a selected distance to permit the selected portion of the tie-down strap to be disposable therebetween, the first member, the second member and the crook having a unitary construction of the same width, the width being greater than the a width of the elastic cord, wherein disposing the respective hook onto the selected portion of the tie-down strap the respective hook is retained in position by frictional engagement with the second member biasing the selected portion of the tie-down strap against the first member.

3. The device of claim 1 wherein a width of the first member and the second member of each hook is at least twice a diameter of the cord.

4. The device of claim 3 wherein the width of the first member and the second member of each hook is at least three times the diameter of the cord.

5. The device of claim 4 wherein the width of the first member and the second member of each hook is at least four times the diameter of the cord.

6. The device of claim 2 wherein a width of the first member and the second member of each hook is at least twice a diameter of the cord.

7. The device of claim 6 wherein the width of the first member and the second member of each hook is at least three times the diameter of the cord.

8. The device of claim 7 wherein the width of the first member and the second member of each hook is at least four times the diameter of the cord.

* * * * *